(12) United States Patent
Rafel Porti et al.

(10) Patent No.: US 11,018,771 B2
(45) Date of Patent: *May 25, 2021

(54) COMMUNICATIONS NETWORK

(71) Applicant: BRITISH TELECOMMUNICATIONS PUBLIC LIMITED COMPANY, London (GB)

(72) Inventors: Albert Rafel Porti, London (GB); Neil James Parkin, London (GB); Stephen Charles Beaumont, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,998

(22) PCT Filed: Mar. 4, 2014

(86) PCT No.: PCT/GB2014/000080
§ 371 (c)(1),
(2) Date: Sep. 1, 2015

(87) PCT Pub. No.: WO2014/135833
PCT Pub. Date: Sep. 12, 2014

(65) Prior Publication Data
US 2016/0013864 A1     Jan. 14, 2016

(30) Foreign Application Priority Data
Mar. 5, 2013 (EP) ..................... 13250023

(51) Int. Cl.
*H04B 10/032* (2013.01)
*H04B 10/27* (2013.01)
(Continued)

(52) U.S. Cl.
CPC ........... *H04B 10/27* (2013.01); *H04B 10/032* (2013.01); *H04B 10/038* (2013.01);
(Continued)

(58) Field of Classification Search
CPC .............. H04B 10/03–038; H04B 10/27–2725
(Continued)

(56) References Cited

U.S. PATENT DOCUMENTS

| | | | |
|---|---|---|---|
| 2002/0071149 A1* | 6/2002 | Xu | H04B 10/032 398/5 |
| 2002/0114028 A1* | 8/2002 | Eijk | H04B 10/077 398/2 |

(Continued)

FOREIGN PATENT DOCUMENTS

| | | |
|---|---|---|
| CN | 1450785 A | 10/2003 |
| JP | 2010-529784 A | 8/2010 |

(Continued)

OTHER PUBLICATIONS

Chan: "Protection Architectures for Passive Optical Network", Chapter 6 of Passive Optical Network—Principles and Practice, 2007, pp. 243-266.*

(Continued)

*Primary Examiner* — Li Liu
(74) *Attorney, Agent, or Firm* — Patterson Thuente Pedersen, P.A.

(57) ABSTRACT

Embodiments disclosed herein provide a hybrid fiber-copper access network in which a main OLT sends data to the DSLAMs via a plurality of point-to-point optical fiber connections. A standby OLT is provided which has a plurality of point-to-multi-point optical fiber connections to the DSLAMs. In the event of a failure, data can be sent to some of the DSLAMs via the standby OLT and the point-to-multi-point optical fiber connections. Following the rectification of (Continued)

the fault, the network can revert to its normal state and transmit data to the DSLAMs via the main OLT and the plurality of point-to-point optical fiber connections.

10 Claims, 5 Drawing Sheets

(51) Int. Cl.
  *H04J 14/02*     (2006.01)
  *H04Q 11/00*     (2006.01)
  *H04L 12/28*     (2006.01)
  *H04M 11/06*     (2006.01)
  *H04L 12/24*     (2006.01)
  *H04B 10/038*    (2013.01)

(52) U.S. Cl.
  CPC ........ *H04J 14/0295* (2013.01); *H04L 12/287* (2013.01); *H04L 12/2859* (2013.01); *H04L 12/2861* (2013.01); *H04L 12/2869* (2013.01); *H04L 41/0668* (2013.01); *H04M 11/062* (2013.01); *H04Q 11/0062* (2013.01); *H04Q 11/0067* (2013.01); *H04Q 2011/009* (2013.01); *H04Q 2011/0096* (2013.01); *Y02D 30/50* (2020.08)

(58) Field of Classification Search
  USPC .............................................. 398/1–8, 58–73
  See application file for complete search history.

(56) References Cited

U.S. PATENT DOCUMENTS

| | | | |
|---|---|---|---|
| 2007/0019956 A1* | 1/2007 | Sorin | H04J 14/0226 398/71 |
| 2007/0058973 A1* | 3/2007 | Tanaka | H04B 10/032 398/1 |
| 2009/0142059 A1* | 6/2009 | Chen | H04J 14/0227 398/58 |
| 2009/0263132 A1 | 10/2009 | Rafel | |
| 2010/0111537 A1 | 5/2010 | Cheng | |
| 2011/0317995 A1* | 12/2011 | Zheng | H04J 14/0282 398/2 |
| 2012/0134664 A1* | 5/2012 | Zheng | H04L 45/22 398/5 |
| 2013/0121684 A1* | 5/2013 | Smith | H04Q 11/0067 398/5 |
| 2014/0050471 A1* | 2/2014 | Bernasconi | H04B 10/032 398/2 |
| 2016/0329984 A1 | 11/2016 | Rafel | |

FOREIGN PATENT DOCUMENTS

| | | |
|---|---|---|
| JP | 2010-258895 A | 11/2010 |
| WO | WO 2009/050459 | 4/2009 |
| WO | WO 2009/057392 A1 | 5/2009 |
| WO | WO 2011/126416 | 10/2011 |
| WO | WO 2012/070089 A1 | 5/2012 |
| WO | WO 2013/022546 A1 | 2/2013 |

OTHER PUBLICATIONS

Koonen: "Fiber to the Home/Fiber to the Premises: What, Where, and When?", Proceedings of IEEE, vol. 94, No. 5, May 2006, pp. 911-934.*
Hajduczenia et al: "Resilience and Service Protection for Ethernet Passive Optical Networks in SIEPON", IEEE Communication Magazine, Sep. 2012, pp. 118-126.*
European Search Report, Application No. 13250023, dated Jul. 22, 2013.
Marek Hajduczenia et al., "Resilience and Service Protection for Ethernet Passive Optical Networks in SIEPON", IEEE Communications Magazine, vol. 50, No. 9, Sep. 1, 2012.
Mitsui et al., "Flexible and Scalable PON Protection Architecture using N: M Redundancy Toward Next Generation Access Network", 2011 17$^{th}$ Asia-Pacific Conference on Communications, 6 pages.
International Search Report, International Application No. PCT/GB2014/000080, dated Apr. 24, 2014.
TECOM, *GP6100 Series—GPON SF PONT*, © 2010, 2 pages.
Office Action for Chinese Application No. 201480012288.2; dated Jan. 26, 2018; (English Translation pp. 1-10; CN Office Action pp. 11-17; total pages 17).
Office Action for Japanese Application No. 2015/560760; dated Jan. 23, 2018; (English Translation pp. 1-3; JP Office Action pp. 4-6; total pages 6).
Dexiang John Xu, "Proposal of a New Protection Mechanism for ATM PON Interface", Communications, 2001. ICC 2001. IEEE International Conference on, Jun. 11, 2001, pp. 2160-2165; Paccon Corporation—A Mitsubishi Company; Duluth, Georgia (6 pages total).
Kimura, Yasutaka, "A proposal of new N:1 PON protection architecture—Interworking and interface between the OLT and optical switch unit", IEICE Technical Report CS2011-97 vol. 111 No. 410, Japan, The Institute of Electronics, Information and Communication Engineers, Jan. 2012; pp. 85-90 (6 pages total).
Masayuki Sato, "A Study on Encryption Key Exchange Method in EPON Protection Switching", IEICE Technical Report CS2012-72 vol. 112 No. 309, Japan, The Institute of Electronics, Information and Communication Engineers, Nov. 2012; pp. 47-51 (5 pages total).

* cited by examiner

COMMUNICATIONS NETWORK

RELATED APPLICATIONS

The present application is a National Phase entry of PCT Application No. PCT/GB2014/000080, filed Mar. 4, 2014, which claims the benefit of EP Application No. 13250023.2 filed Mar. 5, 2013, each of which is incorporated herein by reference in its entirety.

TECHNICAL FIELD

Embodiments relate to a communications network and in particular to a communications network using digital subscriber line (DSL) technology.

BACKGROUND

Asymmetric digital subscriber line (ADSL) systems enable data to be transmitted over a pair of metallic twisted pair (usually copper) wires to customer premises. It is thought that the maximum transmission performance that is likely to be obtained with modern variants of ADSL is a download data rate of 24 Mbps and an upload speed of about 3 Mbps. Such data rates are dependent on the length of the metallic twisted pair from the customer premises to the telephone exchange and thus many customers will receive services at significantly lower data rates.

To improve data rates optical fiber has been installed into the access network. The greatest data rates are likely to be provided using fiber to the premises (FTTP) networks, such as passive optical networks (PONs), but there is a significant cost involved in providing fiber to customer premises. Fiber to the cabinet (FTTCab) networks are known to provide an attractive solution to providing customers with high data rate services without requiring as much investment as FTTP networks. Typically in FTTCab networks, very high bit-rate digital subscriber line (VDSL) systems are used to provide data rates of 40 Mbps and higher, for both upload and download on the metallic twisted pair cables. It is believed that improvements to VDSL systems may provide data rates in excess of 100 Mbps.

FIG. 1 shows a schematic depiction of a known FTTCab network 10 which comprises core network node 100, optical line terminal 200 and a plurality of cabinets 300, the network being used to serve a plurality of domestic (and/or commercial) premises 400. The core network is connected to the optical line terminal (OLT) by an optical fiber cable 150. Data transmitted to the OLT 200 is received by a first OLT line card 205 and is demultiplexed a plurality of second OLT linecards 210. Each of the cabinets has a point-to-point optical fiber connection 250 to the OLT, with each of the cabinets being connected to a dedicated one of the plurality of second OLT linecards 210. Each of the cabinets comprises a linecard 310 for receiving the optical signal from the OLT and converting it into an electrical signal. Each cabinet further comprises a DSLAM (Digital Subscriber Line Add/Drop Multiplexer) 320 which controls the downstream data traffic from the OLT such that it is routed to the appropriate copper transmission lines 350 which connect the cabinet to a plurality of customer premises 400. The DSLAM 320 also combines upstream data received over the copper transmission lines 350 from each of the customer premises such that it can be transmitted over the optical fiber cable 250 to the OLT.

For the sake of clarity, only one of the cabinets 300 is shown as being connected to customer premises. It will be understood that an OLT is capable of supporting many more than four cabinets, and that each of the cabinets may serve a significant number of customer premises.

It can be seen that the network described above with respect to FIG. 1 has limited resilience. If one of the optical fiber links 250 connecting the OLT to a cabinet is broken, or the linecard serving a cabinet were to fail, then all of the customers served by that cabinet will lose service. More significantly, a problem with the OLT 200 would lead to a loss of service, or reduction in service quality, for all of the customers served from the OLT 200.

FIG. 2 shows a schematic depiction of an alternative FTTCab network 10a having improved resilience. It can be seen that the network of FIG. 2 differs from the network described above with respect to FIG. 1 by the addition of a second OLT 200'. The second OLT 200' is identical to the first OLT 200 and has an optical fiber connection 150' to the core node 100. The plurality of second OLT linecards 210' in the second OLT are connected to each of the cabinets 300 via dedicated optical fiber connections 250'. Each of the cabinets has been adapted to comprise first and second linecards 310, 312, which are connected to the first OLT 200 and the second OLT 200', respectively.

In use, one of the OLTs will be designated as being the active OLT and the other OLT will be designated as being the standby OLT. In normal operation, all downstream data will be transmitted from the active OLT to the cabinets and upstream data will be routed from the cabinets to the active OLT. In the event of a failure which would prevent data from being transmitted to and from one or more cabinets, such as a cable break or equipment malfunction, then the data would be routed via the standby OLT until the fault is remedied. The first and second OLTs may be co-located but it is advantageous that they are separated, for example by at least 10 km, so that it is unlikely that a catastrophic event, such as a fire or earthquake, would affect both OLTs at the same time. For improved resilience, both OLTs may have redundant fiber connections to a second core node (not shown).

Such a network architecture improves the resilience of the network although it will be appreciated that a number of potential faults, for example a DSLAM failure, or the severing of the copper line connecting a cabinet to customer premises, cannot be protected against with such an architecture.

Hajduczenia et al, "Resilience and service protection for Ethernet passive optical networks in SIEPON", IEEE Communications Magazine, Vol. 5, no. 9, September 2012, pp 118-126 disclose a number of resilient passive optical networks (PONs). There is no disclosure which is relevant to that of FTTCab networks.

SUMMARY

According to a first aspect, there is provided a communications network comprising: a main primary network node connected to a plurality of secondary network nodes via a plurality of point to point optical fiber connections; and a standby primary network node connected to the plurality of secondary network nodes via a plurality of point to multipoint optical fiber connections.

By using a point to multi-point network architecture for the standby primary node it is possible to provide redundant connections to the secondary nodes at significantly reduced costs. For example, only one port is needed in the standby OLT compared to the multiple ports required in the main OLT along with a possible reduction in the amount of infrastructure work and fiber cabling required to connect to the secondary nodes.

In an embodiment, the plurality of point to multi-point optical fiber connections comprises a PON. The PON may comprise a primary optical splitter co-located with a PON OLT. Alternatively, the primary optical splitter may be co-located with one of the plurality of secondary network nodes. The PON may further comprise one or more secondary optical splitters.

In use, the network may be operated by transmitting data to the plurality of secondary network nodes via the main primary network node and transmitting data to one or more of the plurality of secondary network nodes via the standby primary network node in the event that a failure event is detected.

According to a second aspect, there is provided a method of operating a communications network, the method comprising: i) in a normal operating mode, transmitting data from the main primary network node to the plurality of secondary network nodes via the plurality of point to point optical fiber connections; and ii) if a fault condition is detected, switching to a back-up operating mode in which data is transmitted from the standby primary network node to one or more of the plurality of secondary network nodes via the point to multi-point optical fiber connections.

In an embodiment, the method further comprises: iii) following the rectification of the fault condition, reverting to the normal operating mode such that data is transmitted from the main primary network node to each of the plurality of secondary network nodes via the plurality of point to point optical fiber connections.

BRIEF DESCRIPTION OF THE DRAWINGS

Embodiments will now be described, by way of example only, with reference to the accompanying drawings in which.

DETAILED DESCRIPTION

Figure 1:
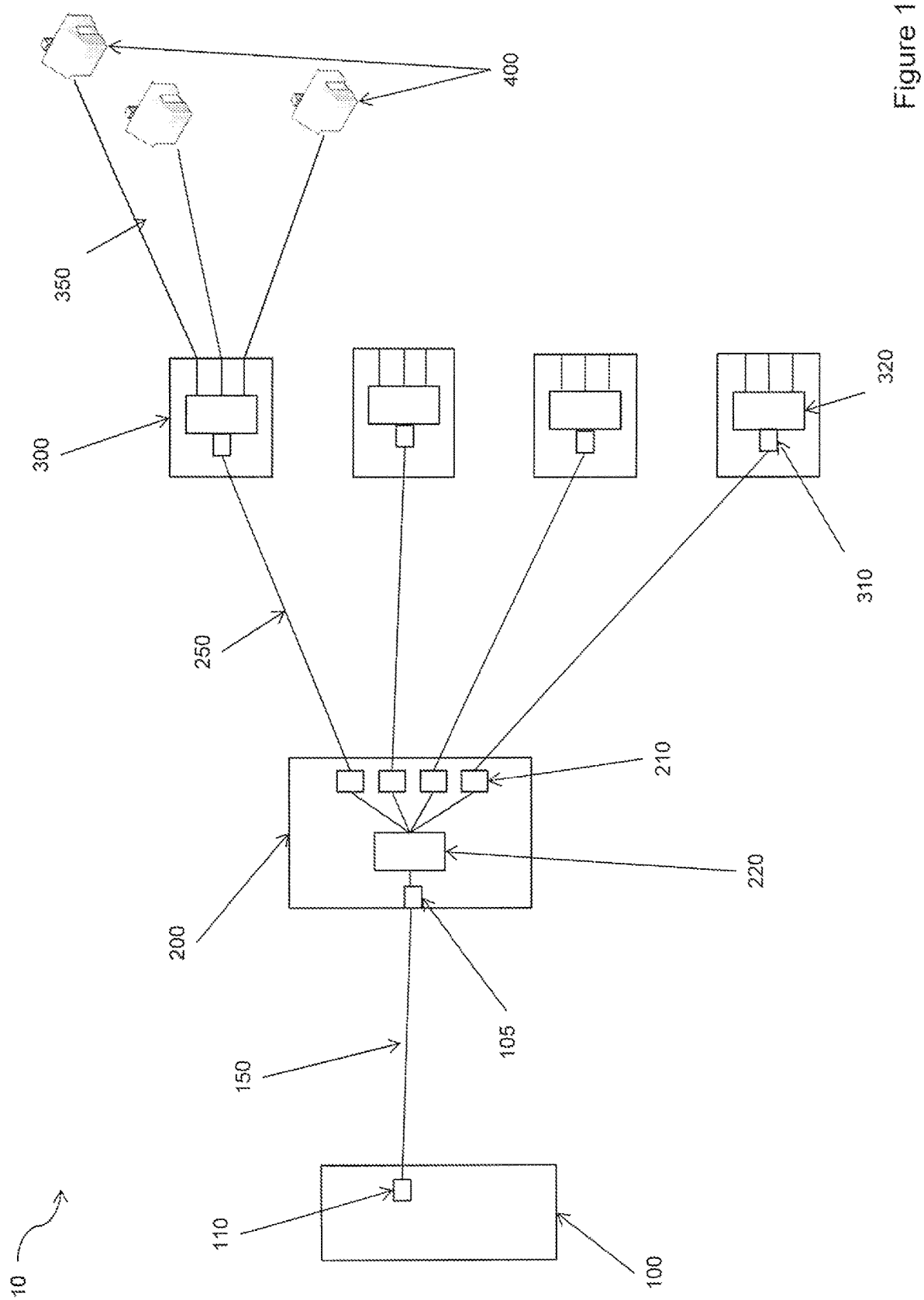
FIG. 1 shows a schematic depiction of a known FTTCab network.
Figure 2:
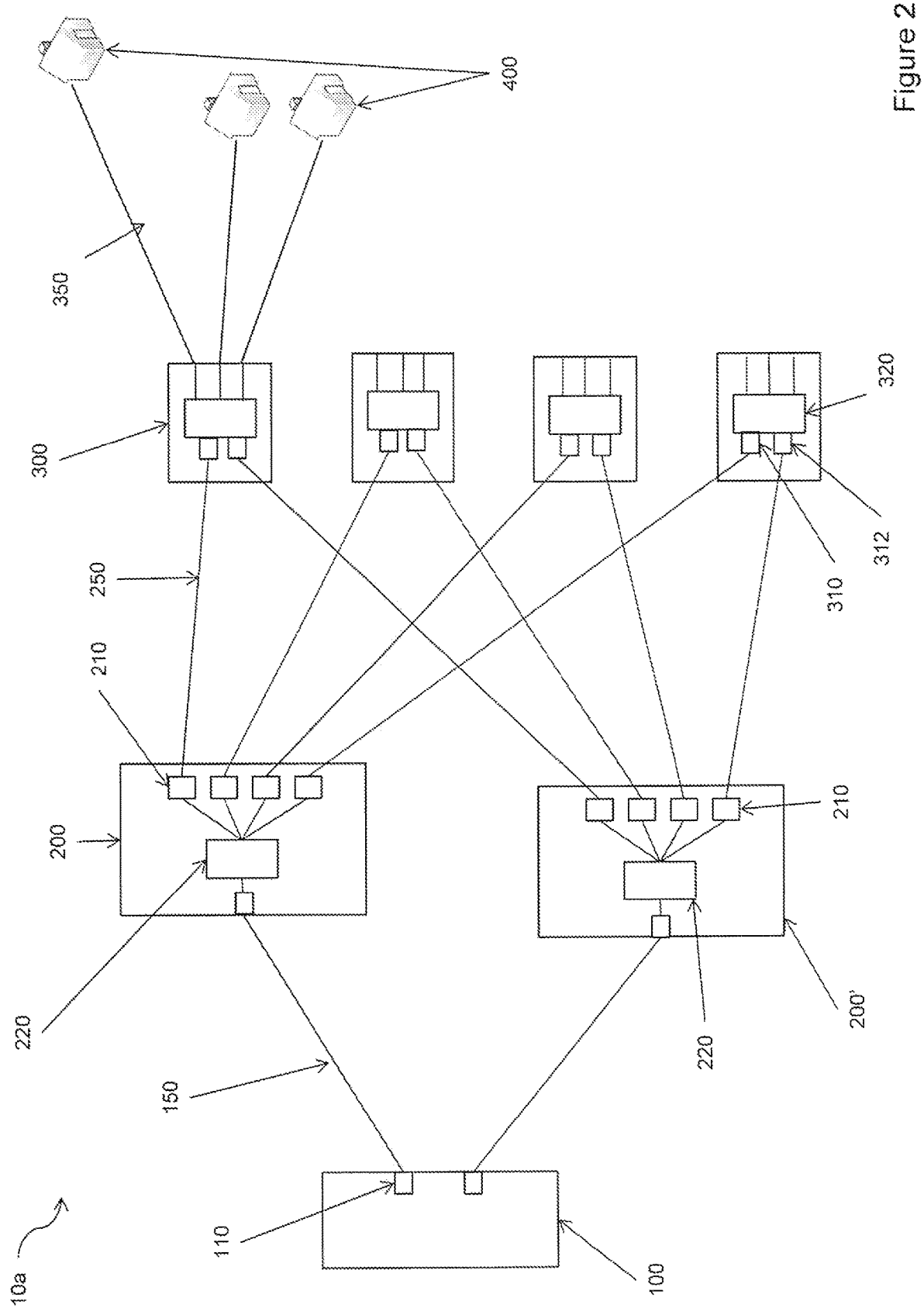
FIG. 2 shows a schematic depiction of a known resilient FTTCab network.
Figure 3:
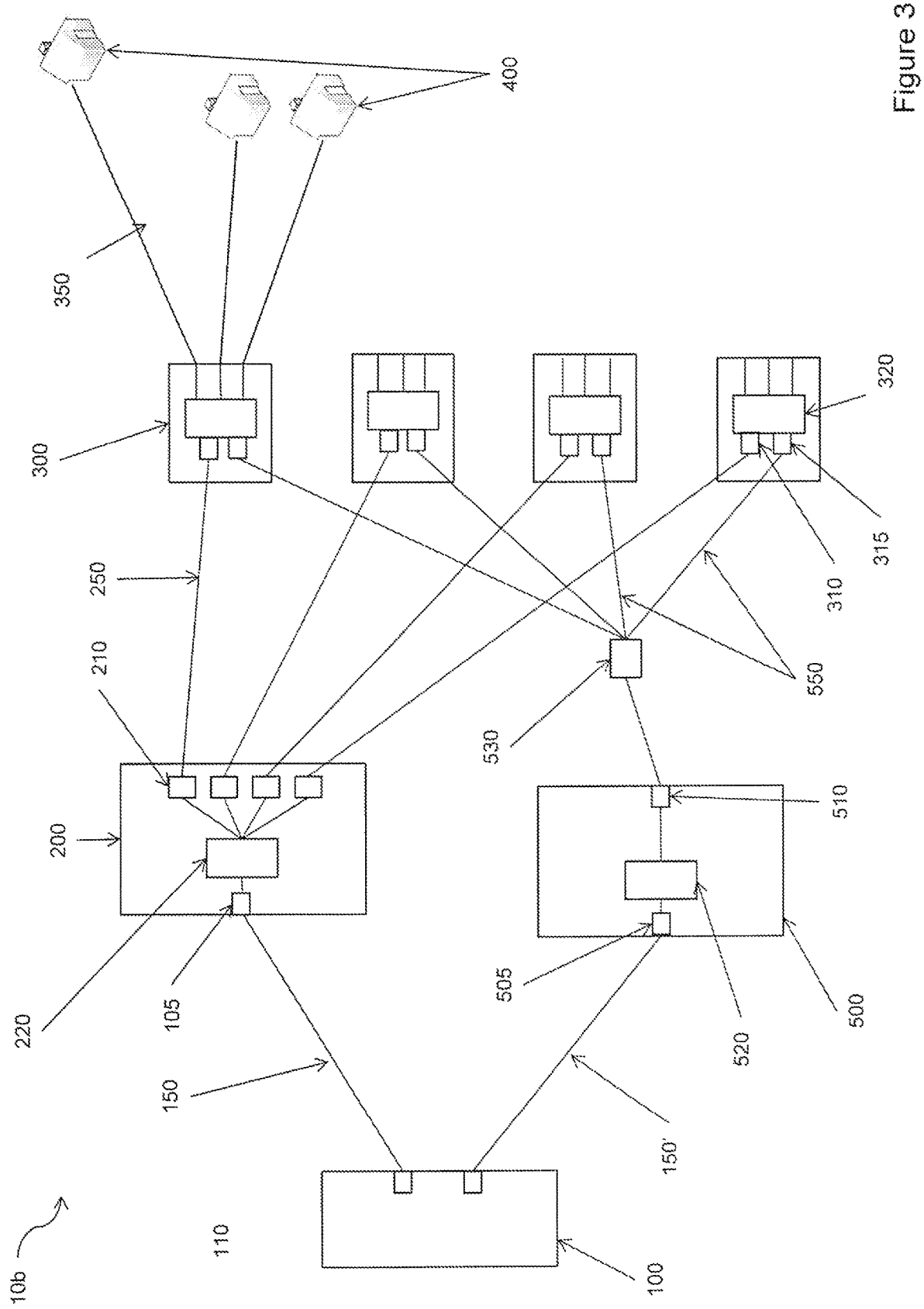
FIG. 3 shows a schematic depiction of a resilient FTTCab network according to an embodiment.

FIG. 3 shows a schematic depiction of a resilient FTTCab network 10*b* according to an embodiment. Network 10*b* comprises a standby OLT 500 which is connected to the core node 100, with linecard 505 receiving the signals sent over the optical fiber link 150'. Multiplexer 520 converts the received signal from the core node and performs any necessary processing for data to be transmitted to the second linecards of the cabinets via a passive optical network (PON). The PON linecard 510 transmits data over a primary PON fiber connection to an optical splitter 530, which has a plurality of optical outputs (typically 8, 16 or 32 optical outputs). Each of the cabinets comprises a point-to-point port 310 and a PON port 315. The point-to point port 310 comprises an optical Gigabit Ethernet (GbE) connection and the PON port 315 comprises a remote Optical Network Unit (ONU). The remote ONU is connected to the optical splitter output via a PON fiber connection 550. The remote ONU may be provided as a SFP (small form-factor pluggable) transceiver such that it can physically fit into an optical GbE port.

In normal use, all data is routed from the core node to the cabinets, and thence to the customer premises, via the active OLT 200 and the point-to-point fiber connections 250. In the event of a network or equipment failure, the standby PON OLT and the PON linecards of the affected cabinets can be activated and data can be routed between the core node and those affected cabinets via the standby PON OLT 500, optical splitter 530 and the PON fiber connection 550. Once the failure has been remedied, for example by replacing a defective linecard or by repairing a severed cable, then the system will revert to its active state, with traffic being routed between the core node and each of the plurality of cabinets via the active OLT 200 and the point-to-point fiber connections 250.

Typically such failure events are rare occurrences and thus significant cost is incurred in providing a standby OLT using a point-to-point network due to the number of ports which must be deployed in such an OLT. As the PON-based standby OLT requires fewer ports, this provides significant cost savings.

The standby PON network may comprise one or more secondary optical splitters located downstream from the optical splitter 530. These secondary optical splitters may be provided to increase the number of cabinets which can be served by the PON linecard.

The PON linecard is preferably a GPON linecard, which enables data rates of up to 2.5 Gb/s being transmitted downstream (with up to 1.25 GB/s in the upstream) over a distance of up to 20 km with a 32-way split. It will be understood that in the event of a complete failure of the active OLT 200 then the standby PON OLT 500 will not be able to provide as much bandwidth as would normally be supplied by the active OLT over the point-to-point fiber links under normal operating conditions. However, such a catastrophic event is thought to be unlikely and it is believed that the most probable failure event will be the severing of one of the point-to-point fiber links or the malfunction of one of the point-to-point linecards in a cabinet. Even if there were a complete failure of the active OLT then it is still possible to provide service to the customer premises, albeit at a lower data rate than normal. It will be understood that enhancements to GPON, such as the XGPON standard (also known as 10G-PON) which can provide 10 Gb/s downstream and up to 2.5 GB/s upstream may be used as an alternative.

Figure 4:
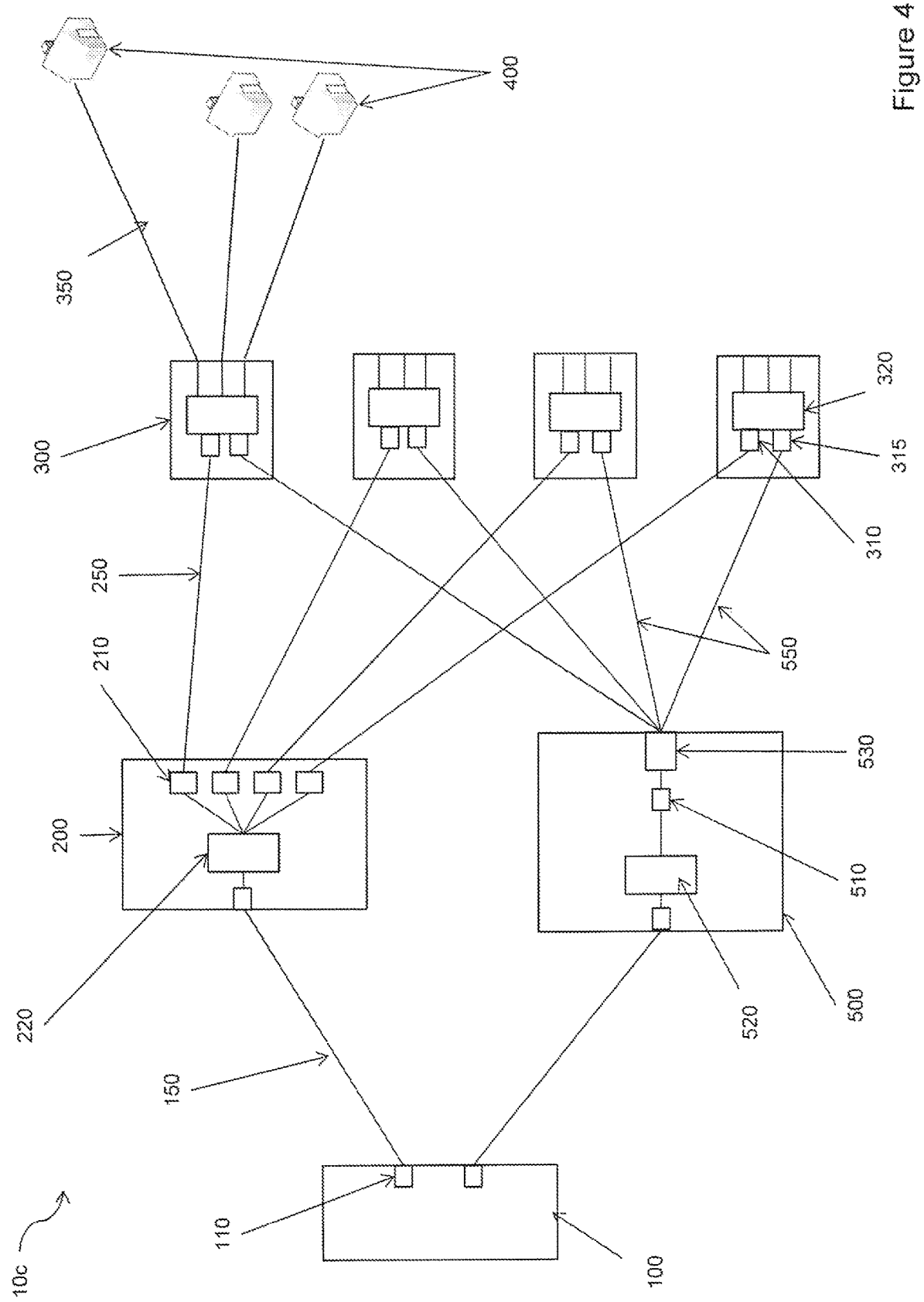
FIG. 4 shows a schematic depiction of a resilient FTTCab network according to an alternative embodiment.

It will be understood that the optical splitter needs to be situated in an external location, for example in an underground chamber or footway box. In some situations it may not be possible to install an optical splitter in a suitable location from which all of the cabinets can be served efficiently. FIG. 4 shows a schematic depiction of a resilient FTTCab network 10*c* according to an alternative embodiment in which the optical splitter 530 is co-located with the PON line card 510 within the standby OLT. The outputs of the optical splitter 530 are then connected to the PON ports 315 via the respective PON fiber connections 550.

It may be necessary to use one or more secondary splitters (not shown) to serve the required number of cabinets. These secondary splitters may be located in network locations which are in between the PON linecard and the cabinets. Alternatively, one or more of the secondary splitters may be co-located with the primary optical splitter and the PON linecard in the standby PON OLT.

Figure 5:
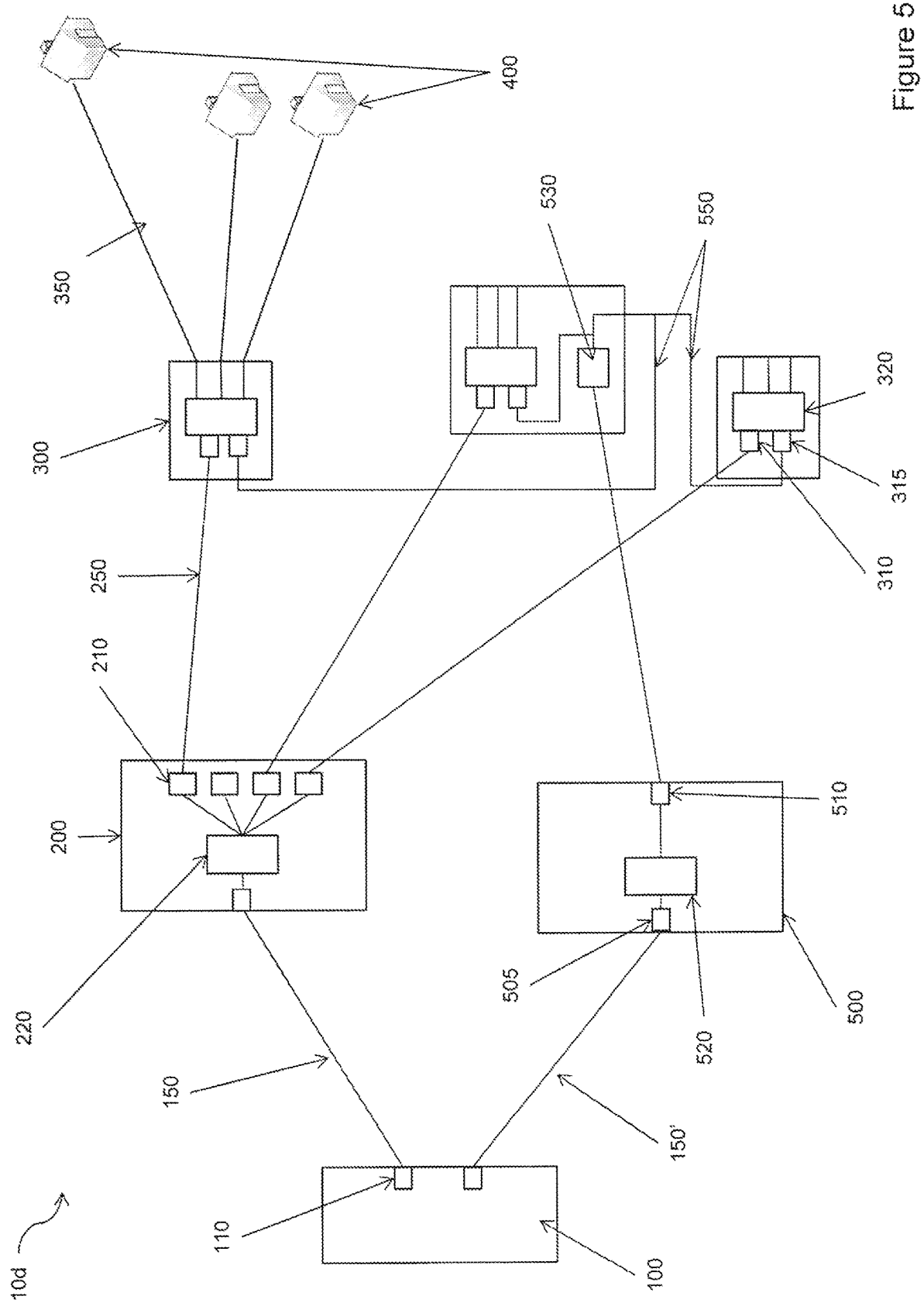
FIG. 5 shows a schematic depiction of a resilient FTTCab network according to a further embodiment in which the primary optical splitter is co-located with one of the cabinets.

FIG. 5 shows a schematic depiction of a resilient FTTCab network 10d according to a further embodiment in which the primary optical splitter is co-located with one of the cabinets. The primary optical splitter is connected to the PON OLT via the optical fiber connection 550. Additionally, the primary optical splitter is further connected to one or more further cabinets (or one or more secondary optical splitters) via further fiber connections. Such a network may prove to be advantageous where there is no suitable location to house a primary optical splitter between the PON OLT and the cabinets and is an alternative to the networks described above with reference to FIGS. 4 & 5 where the primary optical splitter is co-located with the PON OLT. The co-location of the cabinet and the primary optical splitter may involve the direct installation of the splitter within the cabinet. However, VDSL cabinet designs tend to maximize the utilization of available space within a cabinet and thus a co-located splitter may be installed in a footway box adjacent, or near to, to the cabinet.

It will be appreciated that although the preceding discussion has focused on FTTCab network architectures, embodiments could also be applied to other hybrid fiber-copper access network architectures such as, for example fiber to the node, fiber to the distribution point, etc.

In summary, embodiment provides a hybrid fibre-copper access network in which a main OLT sends data to a plurality of DSLAMs via a plurality of point-to-point optical fiber connections. A standby OLT is provided which has a plurality of point-to-multi-point optical fiber connections to the plurality of DSLAMs. In the event of a failure, data can be sent to some of the DSLAMs via the standby OLT and the point-to-multi-point optical fiber connections. Following the rectification of the fault, the network can revert to its normal state and transmit data to the DSLAMs via the main OLT and the plurality of point-to-point optical fiber connections. Only those DSLAMs which have their point-to-point connections affected by the failure will have their traffic re-routed via the standby OLT.

The invention claimed is:

1. A communications network comprising:
a main primary network node, including a main Optical Line Terminal (OLT), connected to a plurality of secondary network nodes, each including an optical Ethernet port and an Optical Network Unit/Terminal (ONU/ONT), via a plurality of point to point optical fiber connections, wherein the main primary network node is node via the plurality of point to point optical fiber connections; and
a standby primary network node, including a standby OLT, connected to the plurality of secondary network nodes via a plurality of point to multi-point optical fiber connections, wherein the standby primary network node is connected to the ONU/ONT in each secondary network node via a passive optical network (PON).

2. A communications network according to claim 1, wherein the PON comprises a primary optical sputter co-located with a PON optical line terminal (OLT).

3. A communications network according to claim 1, wherein the PON comprises a primary optical sputter co-located with one of the plurality of secondary network nodes.

4. A communications network according to Cam 1, wherein the PON further comprises one or more secondary optical splitters.

5. A communications network according to claim 4, wherein the plurality of secondary network nodes are further connected to a plurality of metallic communications links.

6. A communications network according to claim 4, wherein the plurality of secondary network nodes each comprise a digital subscriber line add/drop multiplexer.

7. A communications network according to claim 4, wherein the network comprises a fiber to the cabinet network architecture.

8. A communications network according to claim 4, wherein, in use, the network is operated by transmitting data to the plurality of secondary network nodes via the main primary network node and transmitting data to one or more of the plurality of secondary network nodes via the standby primary network node in the event that a failure event is detected.

9. A method of operating a communications network, the method comprising:
in a normal operating mode, transmitting data from a main primary network node, including a main Optical Line Terminal (OLT), to a plurality of secondary network nodes, each including an optical Ethernet port and an Optical Network Unit/Terminal (ONU/ONT), via a plurality of point to point optical fiber connections, wherein the main primary network node is connected to the optical Ethernet port in each secondary network node via the plurality of point to point optical fiber connections; and
if a fault condition is detected, switching to a back-up operating mode in which data is transmitted from a standby primary network node, including a standby OLT, to the plurality of secondary network nodes via a plurality of point to multi-point optical fiber connections, wherein the standby primary network node is connected to the ONU/ONT in each secondary network node via a passive optical network (PON).

10. A method according to claim 9, the method further comprising:
following a rectification of the fault condition, reverting to the normal operating mode such that data is transmitted from the main primary network node to each of the plurality of secondary network nodes via the plurality of point to point optical fiber connections.

* * * * *